United States Patent
El Ferkouss et al.

(10) Patent No.: US 12,317,220 B2
(45) Date of Patent: May 27, 2025

(54) DISTRIBUTED ACCESS POINT LOCATION DETERMINATION IN ENTERPRISE WIRELESS NETWORKS

(71) Applicant: HEWLETT PACKARD ENTERPRISE DEVELOPMENT LP, Houston, TX (US)

(72) Inventors: Omar El Ferkouss, St Laurent (CA); Sachin Ganu, Santa Clara, CA (US); Vikram Raghu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 367 days.

(21) Appl. No.: 17/874,060

(22) Filed: Jul. 26, 2022

(65) Prior Publication Data

US 2024/0040537 A1    Feb. 1, 2024

(51) Int. Cl.
*H04W 64/00* (2009.01)

(52) U.S. Cl.
CPC .................. *H04W 64/003* (2013.01)

(58) Field of Classification Search
CPC .............. H04W 64/00; H04W 64/003
See application file for complete search history.

(56) References Cited

U.S. PATENT DOCUMENTS

| | | | |
|---|---|---|---|
| 7,414,981 B2 | 8/2008 | Jaramillo et al. | |
| 7,440,573 B2 | 10/2008 | Lor et al. | |
| 7,613,150 B2 | 11/2009 | Nagarajan et al. | |
| 7,639,648 B2 | 12/2009 | Nagarajan et al. | |
| 7,885,233 B2 | 2/2011 | Nagarajan et al. | |
| 8,717,931 B2 | 5/2014 | Taniuchi et al. | |
| 10,045,161 B2 | 8/2018 | Cardoso De Moura et al. | |
| 2007/0159986 A1* | 7/2007 | Park | H04W 64/00 370/254 |

(Continued)

OTHER PUBLICATIONS

Directorate of Overseas Surveys of the Ministry of Overseas Development, "Survey Review", vol. XXIII, No. 176, Apr. 1975, 7 Pgs.

(Continued)

*Primary Examiner* — Zhensheng Zhang
(74) *Attorney, Agent, or Firm* — Sheppard Mullin Richter & Hampton LLP

(57) ABSTRACT

Systems and methods for determining a physical location of access points in a wireless network that include a plurality of access points, the plurality of access points in the wireless network including anchor access points with respective known locations and unanchored access points without respective known locations, may include: a first plurality of unanchored access points neighboring the anchor access points receiving known-location information from the anchor access points, performing range measurements to the anchor access points to determine their respective locations in the wireless network, thereby becoming pseudo-anchor access points; a second plurality of unanchored access points in communicative contact with a plurality of the pseudo-anchor points receiving the determined-location information from the pseudo-anchor access points, performing range measurements to the pseudo-anchor access points to determine their respective locations in the wireless network, thereby becoming pseudo-anchor access points.

17 Claims, 8 Drawing Sheets

(56) References Cited

U.S. PATENT DOCUMENTS

2011/0004913 A1  1/2011  Nagarajan et al.
2017/0127373 A1* 5/2017  Deshpande ......... H04W 12/069
2020/0005295 A1  1/2020  Murphy
2021/0084658 A1  3/2021  Sheriff et al.

OTHER PUBLICATIONS

Norrdine et al., "An Algebraic Solution to the Multilateration Problem", International Conference on Indoor Positioning and Indoor Navigation, Nov. 13-15, 2015, 5 pages.

* cited by examiner

DISTRIBUTED ACCESS POINT LOCATION DETERMINATION IN ENTERPRISE WIRELESS NETWORKS

BACKGROUND

Access points, sometimes referred to as APs, are wireless communication devices used to create and provide access to a wireless local area network (WLAN) in a desired location. Access points are frequently deployed in spaces such as office suites, warehouses, or other large areas where coverage is required that is greater than that which can be provided by a single wireless router. Access points may be deployed in some settings to allow users to roam about the covered space while maintaining connection to the network.

It can be useful in many circumstances to know the locations at which the various access points of a wireless network are positioned. The locations of the access points can be used to determine things such as, for example, network coverage within the designated space, position determination of devices operating on the network, and other features and functions associated with the network and/or its devices.

BRIEF DESCRIPTION OF THE DRAWINGS

The present disclosure, in accordance with one or more various implementations, is described in detail with reference to the following figures. The figures are provided for purposes of illustration only and merely depict typical or example implementations.

Figure 1:
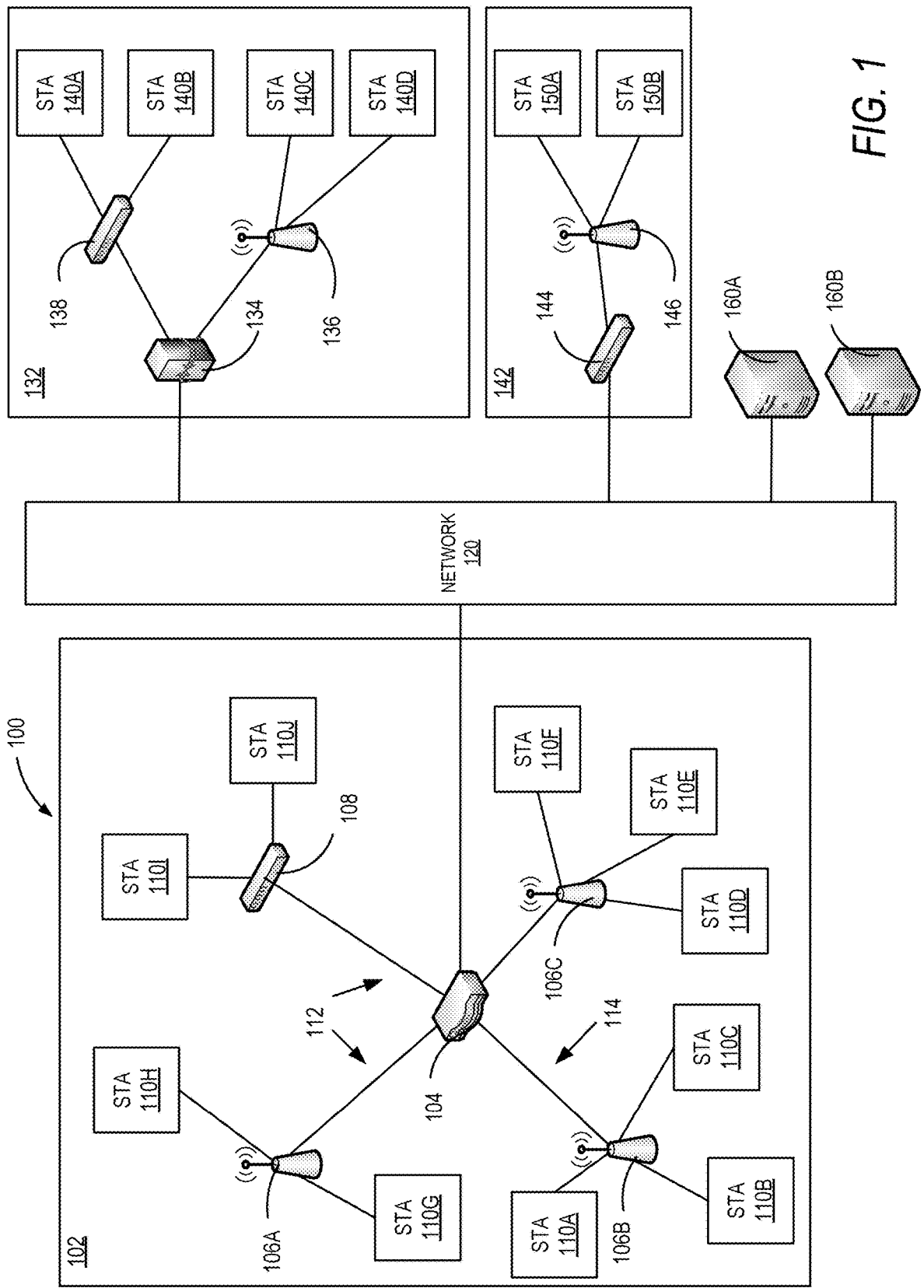
FIG. 1 illustrates an example wireless network deployment in accordance with various implementations.

The figures are not exhaustive and do not limit the present disclosure to the precise form disclosed.

DETAILED DESCRIPTION

Implementations of the technology disclosed herein can be implemented to provide systems and methods for using a distributed method to allow multiple access points on a wireless network to calculate their physical locations in the network automatically. Example implementations may use peer-to-peer messaging among the access points to exchange information useful to calculate their locations.

Implementations may rely on anchor access points with respective known locations, which locations may be determined automatically (e.g., through a GPS receiver or other position determination system), or via manual entry of the respective access point's location by a user. The anchor access points, with their respective known locations, may advertise information about their location and capabilities to other access points on the network. Neighboring access points with unknown locations (i.e., unanchored access points) may be configured to receive this advertised location information and calculate their own respective locations by ranging to a plurality of the anchor access points that are within range (e.g., within communication range). Upon determining their respective physical locations, these previously unanchored access points become pseudo-anchor access points with respective locations that are calculated based on the known locations of the anchor access points such as, for example, by performing multilateration position determination. Accordingly, with their respective physical locations determined, these unanchored access points thereby become, and may be newly designated or redesignated as, pseudo-anchor access points.

This process may continue to another set of one or more unanchored access points in the network. This set may include one or more access points that are not in communicative contact with a sufficient number of anchor access points to determine their location based on anchor access points, but may be in communicative contact with (within range of) a plurality of pseudo-anchor access points or a combination of anchor and pseudo-anchor access points in sufficient quantities to determine their location. For example, this set may be in communicative contact with at least one anchor access point and two pseudo-anchor access points, two anchor access points and one pseudo-anchor access point or three pseudo-anchor access points. This other set of unanchored access points receives location information from its neighboring anchor/pseudo-anchor access points (as applicable), determines ranges and determines its location based on this information such as, for example, by performing multilateration position determination.

This process may continue to further sets of unanchored access points in the network, which may each receive location information and perform ranging to a group of anchor/pseudo-anchor access points with which each respective unanchored access point is within communication range. Accordingly, each remaining unanchored access point may itself determine its location based on the locations of the other access points in the network that have a known or determined location. In this manner, access point locations for all unanchored access points in the network can be determined.

In some implementations, the process may assume that all access points in the network are at the same altitude (height) and can perform the position determination calculations using only coordinates in two dimensions (e.g. latitude and longitude). This assumption is feasible because in many applications, such as office buildings, warehouses, etc., the access points are generally located at the same height throughout the network installation. For example, in a given installation, access points may be uniformly mounted on the ceilings, at a certain height below the ceiling, or at outlet height. Thus, two-dimensional location calculations can be performed with little or no sacrifice in accuracy due to the lack of altitude information.

Before describing implementations of the disclosed systems and methods in detail, it is useful to describe an example network installation with which these systems and methods might be implemented in various applications. FIG. 1 illustrates one example configuration of a wireless network 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. Client devices may also be referred to as stations (STAs).

The wireless network 100 may include a primary site 102 in communication with a network 120. The wireless network 100 may also include one or more remote sites 132, 142, that are in communication with the network 120. These different sites 102, 132, 142 may represent, for example, installations on different floors of a building, different sections of a building, different buildings, different geographic locations, or combinations of the foregoing. Additionally, although sites 102, 132, 142 each show a different specific example configuration, other configurations are possible for each site 102, 132, 142, including, for example, different network topologies, different quantities of routers, access points, switches and other components, and so on.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some implementations, the controller 104 communicates with the network 120 through a router (not illustrated). In other implementations, the controller 104 provides router functionality to the devices in the primary site 102.

A controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106A-C. Switches 108 and wireless APs 106A-C provide network connectivity to various client devices/STAs 110A-J. Using a connection to a switch 108 or AP 106A-C, a STA 110A-J may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, special-purpose computing equipment, instruments, sensors and other client devices.

Within the primary site 102, a switch 108 is included as one example of a point of access to the network established in primary site 102 for wired STA 110I-J. STAs 110I-J may connect to the switch 108 and through the switch 108, may be able to access other devices within the wireless network 100. STAs 110I-J may also be able to access the network 120, through the switch 108. The STAs 110I-J may communicate with the switch 108 over a wired connection 112, 114. In the illustrated example, the switch 108 communicates with the controller 104 over a wired connection 112, though this connection may also be wireless.

Wireless APs 106A-C are included as another example of a point of access to the network established in primary site 102 for STAs 110A-H. Each of APs 106A-C may be a combination of hardware, software, and/or firmware that is configured to provide wireless network connectivity to wireless STAs 110A-H. In the illustrated example, APs 106A-C can be managed and configured by the controller 104. APs 106A-C communicate with the controller 104 and the network over wired connections 112, 114, which may be either wired or wireless interfaces.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

The wireless network 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140A-D.

In various implementations, the remote site 132 may be in direct communication with primary site 102, such that client devices 140A-D at the remote site 132 access the network resources at the primary site 102 as if these clients devices 140A-D were located at the primary site 102. In such implementations, the remote site 132 is managed by the controller 104 at the primary site 102, and the controller 104 provides connectivity, security, and accessibility that enable the remote site 132's communication with the primary site 102. Once connected to the primary site 102, the remote site 132 may function as a part of a private network provided by the primary site 102.

In various implementations, the wireless network 100 may include one or more smaller remote sites 142, comprising only a gateway device 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the wireless network 100 but that facilitate communication between the various parts of the wireless network 100, and between the wireless network 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110A-J, 140A-D, 150A-B may request and access the multimedia content provided by the content servers 160A-B.

The portions of network 120 and/or the individual sites 102, 132, 142, may utilize DFS channels for communication. These DFS channels are required to automatically be vacated upon receipt of a valid radar signal. The valid radar signals may correspond to any suitable standard or standards, and may vary based upon the country, region, or jurisdiction in which the network and/or individual site 102, 132, 142 is located. Vacating a DFS channel can impact the experience of users of the network. Thus, it is desirable to not unnecessarily switch channels. However, interference may accidentally look like a radar signal, creating a false positive.

In various applications of the systems and methods disclosed herein, the functionality for distributed location determination may be performed for the access points at the respective access points. Thus, each access point participating in determining its position or the position of other access points may include processing capabilities to perform the described functions. In various applications, the location determination of access points (e.g. access points 106A-C) may be performed without utilizing the services of a central server or controller.

Figure 2:
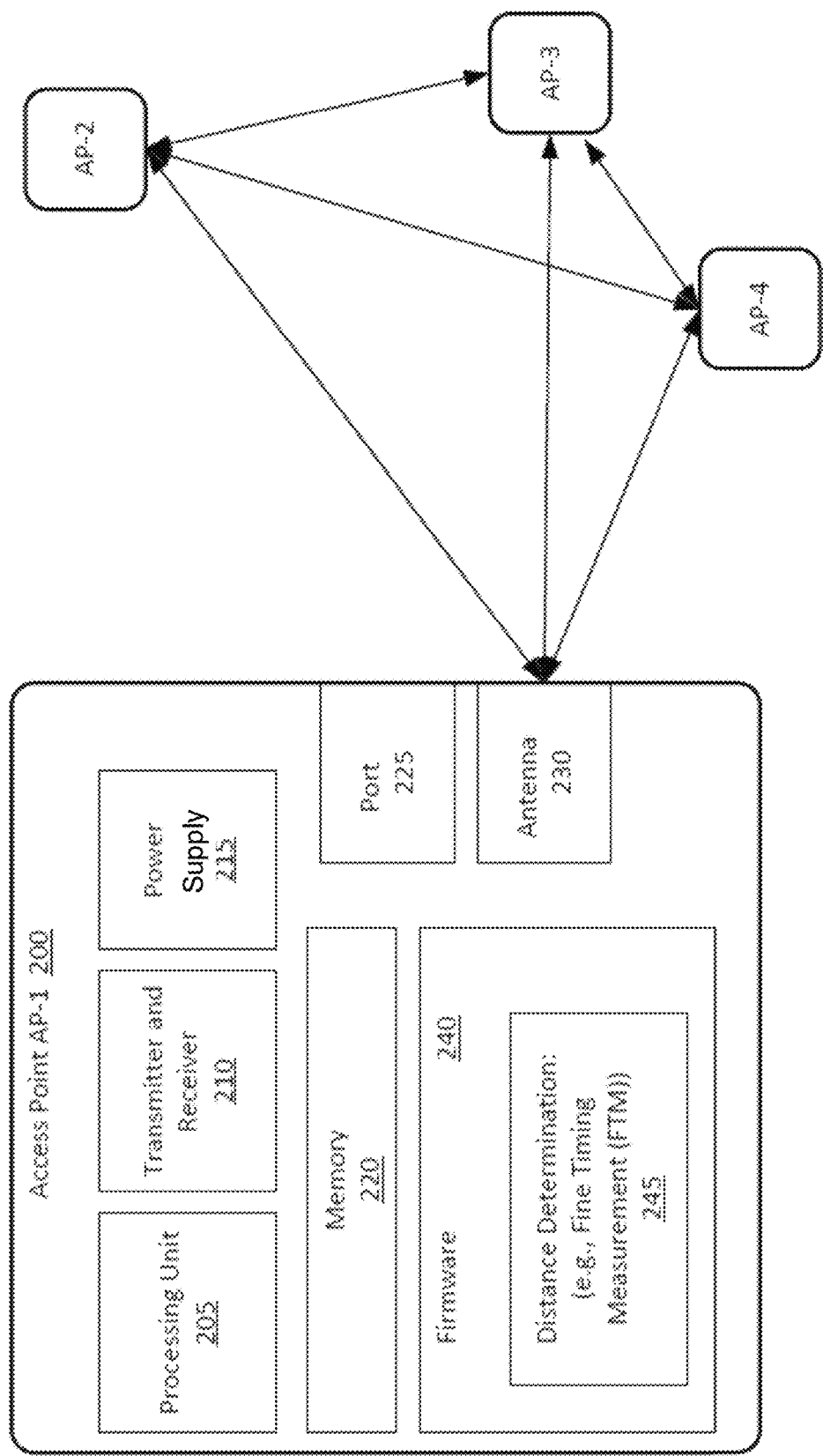
FIG. 2 illustrates an access point in a system to provide automatic AP location according to various implementations.

FIG. 2 illustrates an example of an access point in a system to provide distributed AP location determination according to various implementations. In this example, an access point 200, designated as AP-1, may be one of a plurality of APs in a wireless network in a facility. In this simplified example, the set of APs includes four APs, AP-1, AP-2, AP-3, and AP-4, each in communicative contact with one another. Each access point 200 may include, for example, an access point operating under one or more IEEE (Institute of Electrical and Electronics Engineers) 802.11 standards. In various applications each access point AP-1, AP-2, AP-3, and AP-4 may have the same or similar configurations, whereas in other implementations the access point configurations may vary from one access point to another.

In the illustrated example, access point 200 includes one or more of the following: a processing unit 205, a wireless transceiver circuit 210, a power supply 215, memory 220, communication port 225 for wired network connections, and an antenna 230. Each access point 200 may further include firmware 240 or other software instructions.

Processing unit 205 may include one or more GPUs, CPUs, microprocessors, or any other suitable processing system. Processing unit 205 may include one or more single core or multicore processors. Memory 220 may include one or more various forms of volatile or nonvolatile memory or data storage (e.g., flash, RAM, disk, etc.) that may be used to store instructions (e.g., firmware 240), data and variables for processing unit 205 as well as any other suitable information. Memory 220, may be made up of one or more modules of one or more different types of memory, and may be configured to store data and other information as well as operational instructions that may be used by the processing unit 205 to perform position determination options as disclosed herein as well as other access point operations.

In some implementations, firmware 240 includes instructions or hardware to provide a distance determination 245 between the access point and another access point in the network. In some implementations, the distance determination 245 by access points utilizes time-of-flight measurements of signals between pairs of access points to determine the distance between those pairs of APs. In some applications, the distance measurement may include support for Fine Timing Measurement (FTM).

Although the example of FIG. 2 is illustrated using processor and memory circuitry, as described below with reference to circuits disclosed herein, the access points may be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the various access points in the network.

The access point 200 in this example includes a wireless transceiver circuit 210 with an associated antenna 230 and a wired I/O interface with an associated hardwired data port 225. As this example illustrates, the various access points in the network may include either or both wired and wireless communications circuits. Wireless transceiver circuit 210 may include one or more transmitters and receivers to allow wireless communications via any of a number of communication protocols such as, for example, Wi-Fi (IEEE 802.11 family), WiMAX (IEEE 802.16 family), Bluetooth, near field communications (NFC), Zigbee, and any of a number of other wireless communication protocols whether standardized, proprietary, open, point-to-point, networked or otherwise. Antenna 230 is communicatively coupled to wireless transceiver circuit 210 and is used to transmit radio signals wirelessly to other access points and other wireless equipment with which it is connected, and to receive radio signals from those other devices as well. These RF signals can include information of almost any sort that is sent or received by access points to/from other entities, including other access points.

Port 225 may be included to provide a hardwired interface to other components. Port 225 may be configured, for example, to communicate with other devices using Ethernet or any of a number of other wired communication protocols whether standardized, proprietary, open, point-to-point, networked or otherwise.

Power supply 215 may include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to an external power supply, etc.), an energy harvester (e.g., solar cells, piezoelectric system, etc.), a DC/DC or AC/DC power converter to receive power from an external source (e.g., from an AC mains outlet) and convert the receive power as appropriate for the access point, or it may include any other suitable power supply.

In operation, upon receipt of a request for arranging, such as request from another access point 200, each access point AP-1 to AP-4 may be configured to participate in ranging operations to allow a distance measurement between the other access points to arrive at a set of pairwise distance measurements for the access points. For example, a distance determination, such as an FTM measurement for example, may be performed between AP-1 and each other access point, AP-2, AP-3, and AP-4 in this example, as well for the other pairs of access points.

In various applications, the access points in the network may be configured to determine their own positions using multilateration techniques with other access points in the network, based on ranging measurements to other access points at known locations.

Figure 3:
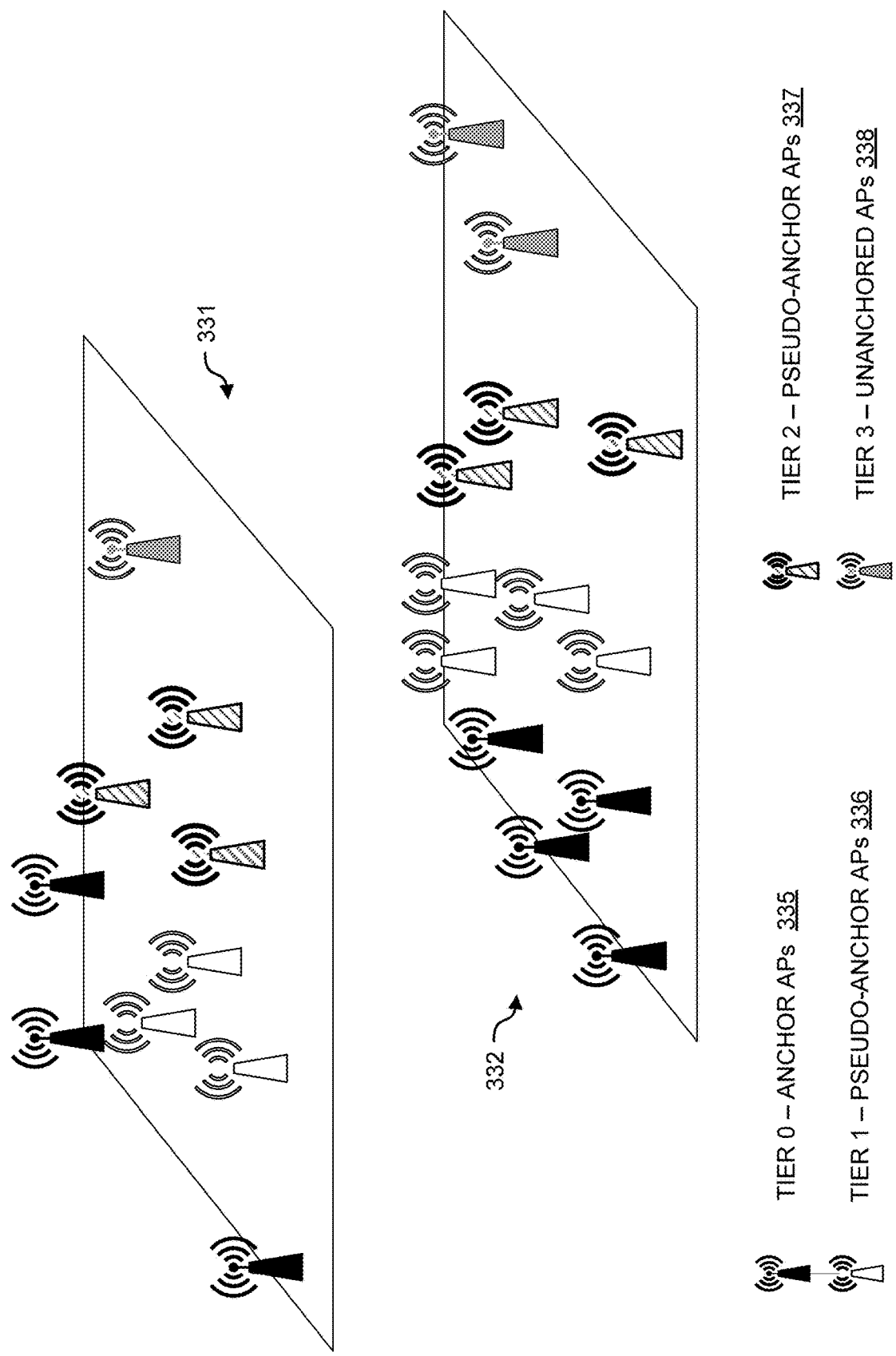
FIG. 3 illustrates a computing device to provide automatic AP location, according to various implementations.

FIG. 3 illustrates two different examples of wireless networks having a distribution of access points in accordance with various implementations. Particularly, this drawing illustrates two example wireless networks 331, 332, each with a plurality sets of one or more of access points 335, 336, 337, 338. Anchor access points (e.g., access points 335) are access points that know their own physical location such as, for example by use of an onboard GPS capability were because of their actual location being programmed manually. Pseudo-access points (e.g., access points 336, 337) are access points that have derived their physical locations using measurements to a plurality of (e.g. three or more) anchor access points (Tier 0 APs) or other pseudo-anchor access points (Tier 1 to (n−1) APs). Unanchored access points are access points whose physical locations have yet to be determined.

Implementations of the distributed location technology may be used to allow multiple access points 336, 337, 338 on their respective wireless network 331, 332 to calculate their own physical locations in the network automatically. Example implementations may use peer-to-peer messaging among the access points 335, 336, 337, 338 to exchange information useful to calculate their locations.

Figure 4:
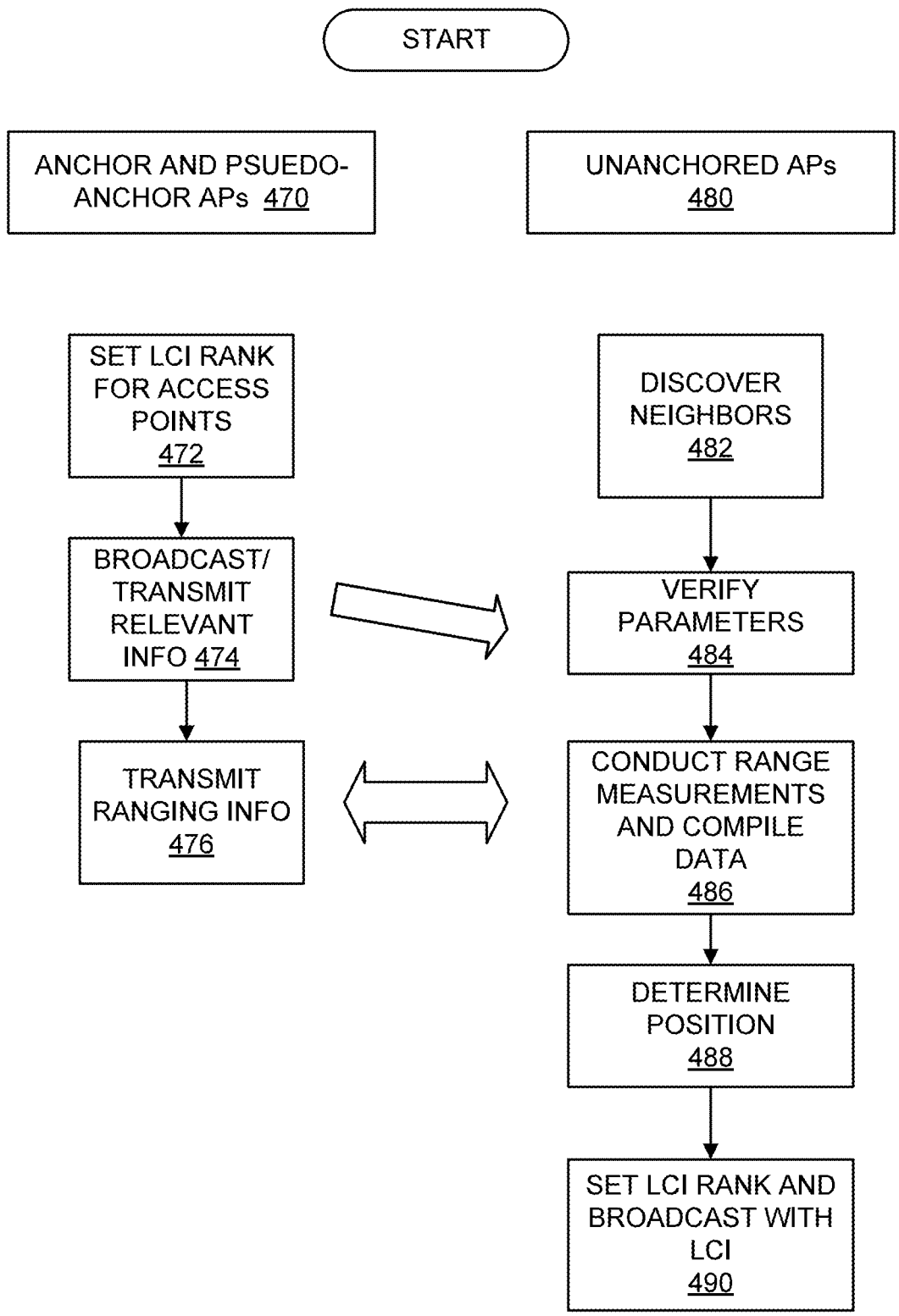
FIG. 4 is an example computing component that may be used to implement distributed access point location determination in accordance with various implementations.

FIG. 4 illustrates an example process for distributed access point position determination in accordance with various implementations. For clarity of discussion, the high level example of FIG. 4 is described with reference to the example networks in FIG. 3, but may be applied in any of a number of different network configurations or topologies.

The example of FIG. 4 is described in terms of operations performed by access points with a known location, such as anchor access points or pseudo-anchor access points; and operations performed by an unanchored access point without a known location. FIG. 4 helps to illustrate an example of interactions between these types of access points during their operation. The steps by each access point in the overall process of FIG. 4 are later described in the examples of FIGS. 5 and 6. Particularly, example operations of anchor access points and pseudo-anchor access points on the one hand, and example operations of unanchored access points on the other hand are illustrated and later described with reference to FIGS. 5 and 6, respectively.

Referring now to FIG. 4, at operation 472, the anchor and pseudo-anchor access points 470 set their respective LCI ranks. In some implementations, the LCI rank may be set to a highest value for that access point. LCI generally refers to Location Configuration Information for an access point, which represents the location coordinates of the access point (e.g., latitude, longitude and altitude co-ordinates, or other coordinate system). LCI may include data uncertainties. In some implementations, the locations of the access points in the network are all assumed to be at the same altitude. Accordingly, the coordinates may include latitude and longitude only, or they may include actual data for latitude longitude and a fixed or assumed value for altitude.

The LCI rank is a value representing the hierarchy in propagating LCI information to other access points. In one application, anchor access points are designated as Tier 0 access points and may accordingly be given a highest rank in the system. Tier 1 will have the next highest rank and so on. By way of example, a Tier 1 pseudo-anchor access point derives its physical location from three or more Tier 0, or anchor, access points; Tier 2 pseudo-anchor access points derive their physical location from Tier 0 (Anchor) access points, Tier 1 (pseudo-anchor) access points or a combination of Tier 0 and Tier 1 access points; and Tier n pseudo-anchor access points derive their physical location from Tier 0 (Anchor) access points, Tier 1 through Tier n−1 (pseudo-anchor) access points or a combination of the foregoing. In implementations using multilateration, a combination of three or more higher ranked access points are used for location determination.

At operation 474, anchor and pseudo-anchor access points 470 transmit information to the unanchored access points within communication range to facilitate location determination by those unanchored access points. This may include information that may be used by the unanchored access points to determine their locations. Particularly, in some applications, the anchor access points and pseudo-anchor access points may make available their respective ranging capability (i.e., whether it supports FTM protocol or other ranging capability), LCI and LCI rank. As noted above, the LCI represents the location of the broadcasting access point. For an anchor node, this may be set to the manually configured or GPS-based location coordinates, and for a pseudo-anchor node, this may be the location determined by that node during its location determination operation. The anchor or pseudo-anchor access points may unicast their LCI in an FTM response message to the unanchored access point, identifying the anchor or pseudo-anchor access point's actual location.

As also noted above, the LCI rank establishes a hierarchy of access points. This may be broadcast in beacons to the receiving unanchored access points. This may be set to the highest value for anchor access points (e.g., set to 255 for anchor access points) and lower values as the assignments progress down the ranking.

The access points' FTM responder capabilities and LCI ranks may be broadcast in beacons and made available to all neighboring access points. While the LCI could be broadcast in the access points' beacons, some applications may implement a more limited approach. For example, the access points' respective LCIs may be included in some implementations only in FTM responses when a neighboring access point initiates FTM measurements to the anchor access point.

Having now set the anchor or pseudo-anchor access points LCI, and having advertised the respective broadcast capabilities and LCI ranks of those anchor or pseudo-anchor access points 470, neighboring unanchored access points 480 can use this information to begin determining their respective locations.

Thus, at operation 482, unanchored access points 480 discover neighboring access points. In some implementations, unanchored access points 480 in the network may scan the network communication channels to discover neighboring anchor or pseudo-anchor access points 470 in the network. In various implementations, this can be done using standard discovery techniques. For example, unanchored access points 480 can be configured to scan all radio channels to discover FTM responder and anchor or pseudo-anchor access point neighbors within communication range. In various networks, this discovery can be performed based on information transmitted by anchor and pseudo-anchor access points 470 at operation 474. In various applications, this discovery may also be accomplished based on other information that may be transmitted by anchor or pseudo-anchor access points 470 in the network (e.g. during beaconing).

At operation 484, each unanchored access point 480 investigates information received to determine whether it can begin an operation to determine its location. As part of this operation, each unanchored access point 480 may discover anchor or pseudo-anchor access points 470 within communication range. Upon discovering anchor or pseudo-anchor access points 470 within communication range, each unanchored access point 480 may check the LCI rank of its neighbors to determine whether the LCI rank is higher than its own LCI rank (which it may have previously determined). As described above, the LCI rank is included in the information sent by the anchor and pseudo-anchor access points 470 at operation 474.

If there are no neighbors with a higher LCI rank in communication range of a subject unanchored access, ranging is not performed for that subject unanchored access point 480, and that subject unanchored access point 480 may continue to scan for neighbors in its vicinity. If additional neighbors are discovered within communication range, the subject unanchored access point 480 may determine whether any of the additional neighbors has a higher LCI rank.

If there are neighbors in communication range of the subject unanchored access point 480 that do have a higher LCI rank than the subject unanchored access point 480, the subject unanchored access point 480 may determine whether there is a sufficient quantity of neighbors having a higher LCI rank. As noted above, for multilateration in two dimensions, three or more neighbors are utilized for position determination. Therefore, the subject unanchored access point 480 may operate to determine whether there are three or more neighbors having a higher LCI rank than its own rank.

If there is not a sufficient quantity of neighbors with a higher LCI rank than the subject unanchored access point 480, the subject access point may continue scanning to discover additional anchor or pseudo-anchor access points. If there is a sufficient quantity of anchor or pseudo-anchor access points 470 in the vicinity of the subject unanchored access point 480, the process of determining the location of the unanchored access point 480 may progress.

Thus, at operation 486, the subject unanchored access point 480 that is in communication range of a sufficient quantity of anchor or pseudo-anchor access points 470 conduct range measurements and compile the ranging data. As noted above, in some implementations the range measurements are performed by ranging to three or more anchor or pseudo-anchor access points with known locations. As previously noted, in some implementations, this can be performed using FTM (fine timing measurement) protocol based on a round-trip time, or time of flight, as specified in IEEE802.11mc. Using this protocol, the distance between two access points is estimated by a time of flight using signal propagation. An initiator access point transmits an FTM request to the other access points, requesting that the other access points begin the ranging process. It may do this one at a time, for each access point in its vicinity. Anchor and pseudo-anchor access points 470 can respond by transmitting ranging information at operation 476. After the initiator receives the response to the FTM request from the responder, the ranging process between the pair of access points may begin.

In the ranging process, the responder sends the FTM frame at time t1 and waits for an acknowledgment (ACK) from the initiator. The initiator receives the FTM frame at time t2 and responds with its ACK at time t3. The responder receives the ACK at time t4. The responder may now send an FTM frame, including data indicating the times t1 and t4. Upon receiving the FTM frame, the initiator now has data indicating the times times, t1, t2, t3, and t4. The difference between the times t1 and t4 (e.g., t4−t1), includes the processing time for the signaling between the access points. This processing time (t3−t2) is subtracted from the total time to determine the time-of-flight. Accordingly, the round trip time-of-flight is computed as the total time minus the processing time, or (t4−t1)−(t3−t2). This time of flight is multiplied by the speed of propagation of the information (assumed to be the speed of light) to determine the distance the signals traveled between the access points. However, because this is a round-trip distance, it is divided by two to obtain the one-way distance between the two access points. The measurements may use a random backoff to avoid a deadlock situation caused by two access points initiating ranging to each other at the same time, and to ensure that there is no overlap or ambiguity by ranging to the wrong access point.

As part of this operation, the access points can compile the ranging information collected in this step into a set of information that can be used to perform the location measurement. In one example, the information can be compiled for an unanchored access point 480 to include an identification of each neighbor (e.g., BSSID), the calculated range to the relevant neighbors, the LCI for those neighbors and the LCI rank of those neighbors. As noted above, in some implementations altitude data is not considered and the access points are assumed to be in the same plane. An example of this data is shown in table form in Table 1, below.

TABLE 1

Ranging Information Table

| BSSID (neighbor ID) | FTM Range | LCI (if available) no altitude; | LCI-Rank (if available) |
|---|---|---|---|
| 1A:3E:5D:XX:XX:X1 | 5.2 m | 37.1212N, 121.3214E | 255 |
| 1A:3E:5D:XX:XX:X2 | 6.8 m | 37.1211N, 121.3214E | 255 |
| 1A:3E:5D:XX:XX:X3 | 7.3 m | 37.1210N, 121.3215E | 255 |

At operation 488 of FIG. 4, the unanchored access point 480 having a sufficient set of information collected at operation 486 uses this information to determine its position (e.g., to calculate its coordinates). An example of trilateration used to perform position determination is described further below with reference to FIG. 7.

The subject unanchored access point 480 now has position coordinates and therefore now becomes newly designated as a pseudo-anchor access point 470. At operation 490, the subject (previously unanchored) access point (which is now a newly designated pseudo-anchor access point 470) calculates and sets its LCI rank and broadcasts its LCI rank and its LCI. The LCI broadcast can include the coordinates for the subject access point. The access point's LCI rank can be determined using the LCI rank of the anchor access points or pseudo-anchor access points 470 that were used for its location estimation. Particularly, in some implementations, the LCI rank of the subject access point may be decremented by one from the LCI rank of the anchor or pseudo-anchor access points 470 used for its location estimation. Where a combination of anchor or pseudo-anchor access points with different LCI ranks are used, the LCI rank of the subject access point can be decremented by one from the lowest LCI rank of these neighbors. In other applications, other amounts may be decremented to determine the LCI rank. With its location determined and its information broadcast, the subject access point may now operate as a pseudo-anchor access point 470 and may be used by remaining unanchored access points in determining their locations.

The above described process of determining the location of unanchored access points can be repeated for each remaining unanchored access point 480 in the network. This can be performed by the respective unanchored access points such that there are no remaining unanchored access points in the network and all access points are associated with their respective physical location.

In some implementations, a pseudo-anchor access point may be configured to recalculate its position in certain circumstances. For example, a pseudo-anchor access point may recalculate its LCI (and perhaps its LCI rank) if a new threshold number of neighbors of a higher rank are discovered. This may occur, for example, where a new Tier 0 anchor access point is added and is within range, or if new, higher ranking pseudo access point(s) are added and within range.

Figure 5:
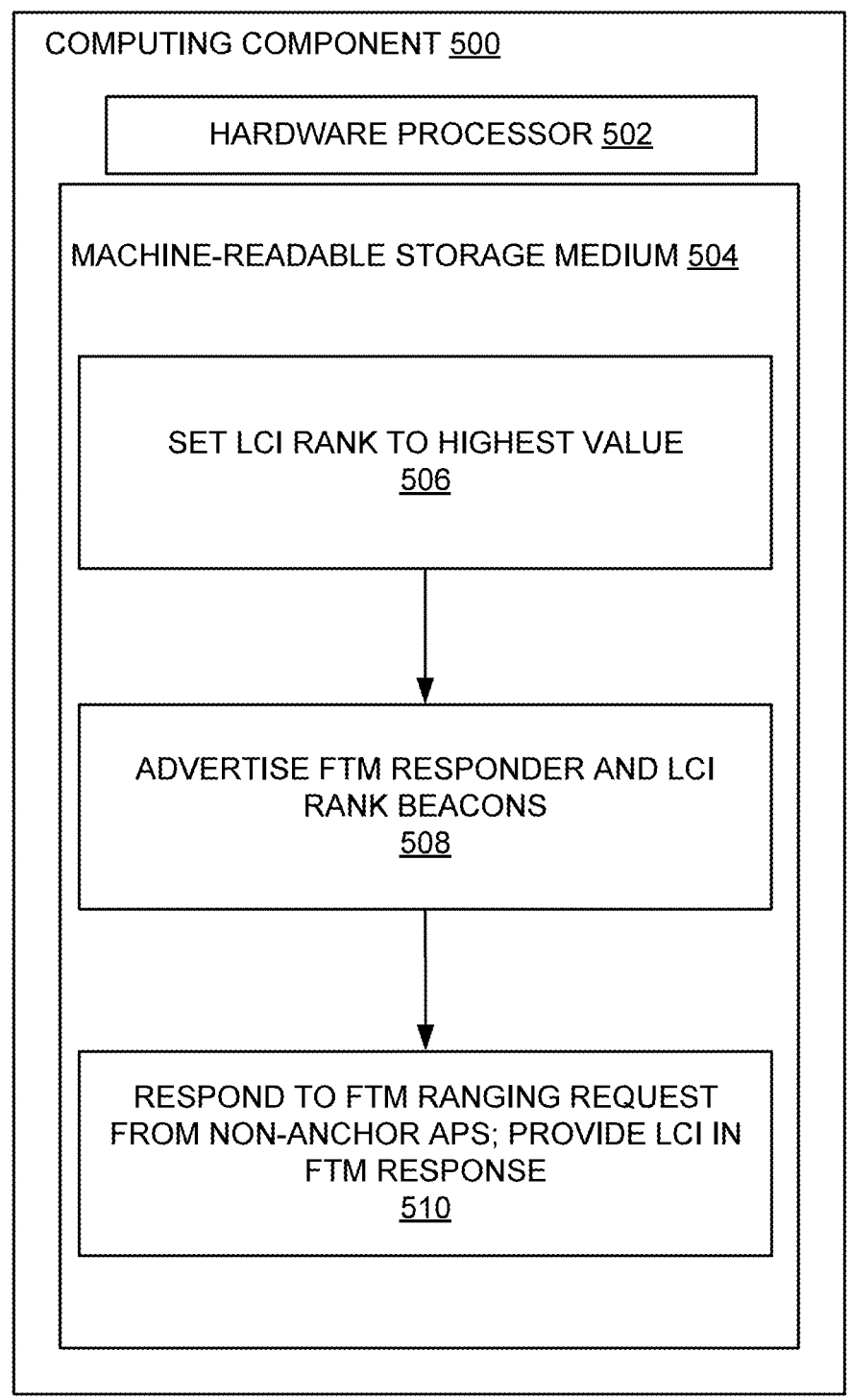
FIG. 5 is an example computing component that may be used to implement distributed access point location determination in accordance with various implementations.

FIG. 5 illustrates an example computing component implemented at an anchor or pseudo-anchor access point to facilitate location determination operations at an unanchored access point. For context and clarity of discussion, the example of FIG. is described in terms of anchor access points or pseudo-anchor access points 470 and unanchored access points 480 of FIG. 4. Referring now to FIG. 5, computing component 500 may be, for example, a server computer, a controller, or any other similar computing component capable of processing data. In the example implementation of FIG. 5, the computing component 500 includes a hardware processor 502, and machine-readable storage medium 504.

Hardware processor 502 may be one or more central processing units (CPUs), semiconductor-based microprocessors, and/or other hardware devices suitable for retrieving and executing instructions stored in machine-readable storage medium 504. Hardware processor 502 may fetch, decode, and execute instructions, such as instructions 506-510 to control processes or operations for distributed automatic access point location determination. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some implementations, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-510.

As shown in FIG. 5, hardware processor 502 of an anchor or pseudo-anchor access point 470 may execute instruction 506 to set the LCI rank for the subject anchor or pseudo-anchor access point 470. In some implementations, the LCI rank may be set to a highest value for that access point.

Hardware processor 502 of the anchor or pseudo-anchor access point 470 may execute instruction 508 to broadcast information to unanchored access points 480, which information may be used by the unanchored access points 480 to determine their locations. Particularly, in some applications, the anchor access points and pseudo-anchor access points 470 may make available their respective ranging capability (i.e., whether they support FTM protocol or other ranging capability), LCI and LCI rank.

Hardware processor 502 of the anchor or pseudo-anchor access point 470 may execute instruction 510 to provide its location information to the unanchored access points 480. This information may be provided, for example, in response to an FTM ranging request received from one or more neighboring unanchored access points 480. As noted above, its location can be represented as its LCI (Location Configuration Information), which represents the location coordinates of the access point (e.g., latitude, longitude and altitude co-ordinates, or other coordinate system). In some implementations, the locations of the access points in the network may all assumed to be at the same altitude. Accordingly, the coordinates may include latitude and longitude only, or they may include actual data for latitude longitude and a fixed or assumed value for altitude. This information may be used by receiving unanchored access points 480 to determine their respective locations.

Figure 6:
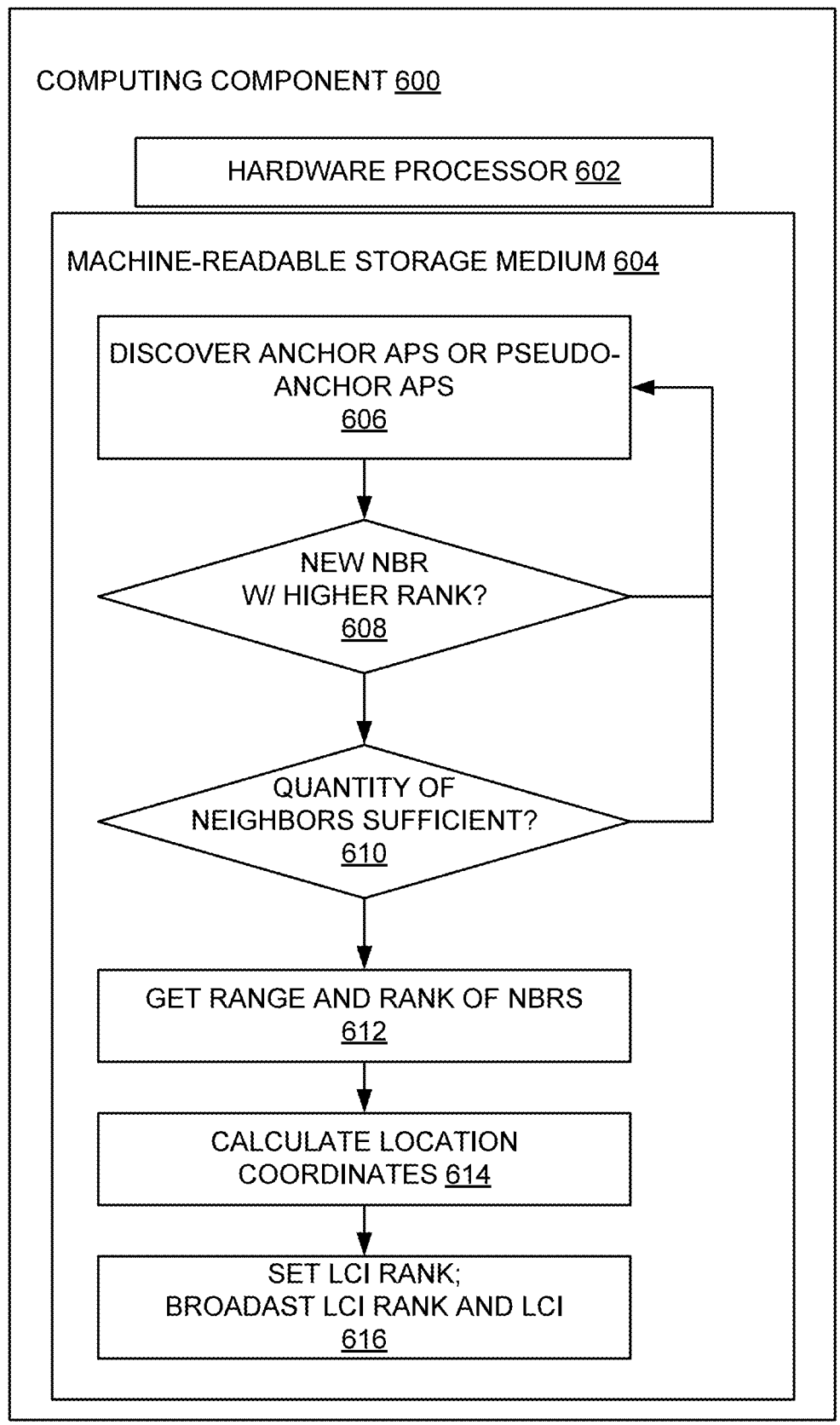
FIG. 6 is an example computing component that may be used to implement distributed access point location determination in accordance with various implementations.

FIG. 6 illustrates an example computing component implemented at an unanchored access point to conduct location determination for the unanchored access point. For context and clarity of discussion, the example of FIG. 6 is described in terms of anchor access points or pseudo-anchor access points 470 and unanchored access points 480 of FIG. 4. Computing component 600 may be, for example, a server computer, a controller, or any other similar computing component capable of processing data. In the example implementation of FIG. 6, the computing component 600 includes a hardware processor 602, and machine-readable storage medium 604.

Hardware processor 602 may be one or more central processing units (CPUs), semiconductor-based microprocessors, and/or other hardware devices suitable for retrieving and executing instructions stored in machine-readable storage medium 604. Hardware processor 602 may fetch, decode, and execute instructions, such as instructions 606-616 to control processes or operations for distributed automatic access point location determination. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some implementations, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-616.

As seen in the example of FIG. 6, hardware processor 602 of an unanchored access point 480 may execute instruction 606 to cause the subject unanchored access point 480 in the network to scan the network communication channels to discover neighboring anchor or pseudo-anchor access points 470 in the network. In various implementations, this can be done using standard discovery techniques. For example, unanchored access points 480 can be configured to scan all radio channels to discover FTM responder and anchor or pseudo-anchor access point neighbors within communication range. In various networks, this discovery can be performed based on information transmitted by anchor and pseudo-anchor access points 470 (e.g., as shown at operation 474 in FIG. 4 and at instruction 508 in FIG. 5).

Hardware processor 602 of an unanchored access point 480 may execute instructions 608 and 610 to cause the subject unanchored access point 480 to investigate information received to determine whether it can begin operations to determine its location. As part of this operation, the subject unanchored access point 480 may discover one or more anchor or pseudo-anchor access points 470 within communication range. Upon discovering one or more anchor or pseudo-anchor access points 470 within communication range, the subject unanchored access point 480 may check the LCI rank of its neighbors to determine whether the LCI rank is higher than its own LCI rank (which it may have previously determined). This is shown at instruction 608. As described above, the LCI rank is included in the information sent by the anchor and pseudo-anchor access points 470 (e.g., as shown at operation 474 of FIG. 4 and at instruction 508 of FIG. 5).

If there are no neighbors in communication range of the subject access point with a higher LCI rank, ranging is not performed for that unanchored access point 480, and operations for that access point resume at instruction 606 where that unanchored access point 480 may continue to scan for neighbors in its vicinity. If additional neighbors are discovered, hardware processor 602 may again execute instruction 608 to determine whether any of the additional neighbors has a higher LCI rank. Additionally, because the LCI rank of neighbors can change over time, hardware processor 602 may periodically repeat instruction 608 for the subject unanchored access point 480 to determine whether any neighbors exist with a higher LCI rank.

If, on the other hand, there are neighbors within communication range of the subject unanchored access point 480 that do have a higher LCI rank than the subject unanchored access point 480, hardware processor 602 may execute instruction 610 to determine whether there is a sufficient quantity of neighbors having a higher LCI rank than the subject unanchored access point 480. As noted above, for multilateration in two dimensions, three or more neighbors are utilized for position determination. Therefore, instruction 610 may be configured to cause the subject unanchored access point 480 to determine whether there are three or more neighbors having a higher LCI rank.

If there is not a sufficient quantity of neighbors with a higher LCI rank than the subject unanchored access point 480, the operation resumes at instruction 606 where the access point may continue scanning to discover additional anchor or pseudo-anchor access points 470, and where periodic rechecking by executing instructions 608 and 610 may be performed. If, on the other hand, there is a sufficient quantity of anchor or pseudo-anchor access points in the vicinity of the subject unanchored access point 480, the process of determining the location of the subject unanchored access point 480 may progress.

the subject unanchored access point 480 that is in communication range of a sufficient quantity of anchor or pseudo-anchor access points 470 conducts range measurements and compile the ranging data. As noted above, in some implementations the range measurements are performed by ranging to three or more anchor or pseudo-anchor access points with known locations. Accordingly, hardware processor 602 may execute instruction 612 at the subject unanchored access point 480 to perform the ranging measurements. Using the FTM protocol, the distance between two access points may be estimated by a time of flight using signal propagation. In such implementations, and initiator access point may transmit an FTM request to the anchor or pseudo-anchor access points 470, requesting that those access points begin the ranging process. The subject unanchored access point 480 may do this one at a time, for each access point in its vicinity. Anchor and pseudo-anchor access points 470 can respond by transmitting ranging information (e.g., as shown at operation 476 of FIG. 4 and at instruction 510 of FIG. 5). After the initiator receives the response to the FTM request from the responder, the ranging process between the pair of access points may begin.

Hardware processor 602 executes instruction 614 to perform position determination for (e.g., to calculate the coordinates of) the unanchored access point 480. One example of position determination is described below with reference to FIG. 7.

Hardware processor 602 executes instruction 616 to cause the subject access point (which is now a newly designated pseudo-anchor access point) to calculate and set its LCI rank, and to broadcast its LCI rank and its LCI. The LCI broadcast can include the coordinates for the subject access point (now a pseudo-anchor access point 470). The access point's LCI rank can be determined using the LCI rank of the anchor access points or pseudo-anchor access points 470 that were used for its location estimation. Particularly, in some implementations, the LCI rank of the subject access point is a value that is decremented by one from the LCI rank of the anchor or pseudo-anchor access points used for its location estimation. Where a combination of anchor or pseudo-anchor access points 470 with different LCI ranks are used, the LCI rank of the subject access point can be decremented by one from the lowest LCI rank of these neighbors. In other applications, other amounts may be decremented to determine the LCI rank. With its location determined and its information broadcast, the subject access point may now operate as a pseudo-access point 470 and may be used by remaining unanchored access points 480 in its vicinity in determining their locations.

As noted above with reference to FIG. 4, the process of determining the location of unanchored access points can be repeated for each remaining unanchored access point in the network. This can be performed by each of the respective unanchored access points for a such that there are no remaining unanchored access points in the network and all access points are associated with their respective physical location.

As alluded to above, in some implementations, the process of position determination as described herein may assume that all access points in the network are at the same altitude (height) and can perform the position determination calculations using only coordinates in two dimensions (e.g. latitude and longitude). This assumption is feasible because in many applications, such as office buildings, warehouses, etc., the access points are generally located at the same height throughout the network installation. For example, in a given installation, access points may be uniformly mounted on the ceilings, at a certain height below the ceiling, or at outlet height. Thus, two-dimensional location calculations can be performed with little or no sacrifice in accuracy due to the lack of altitude information.

Figure 7:
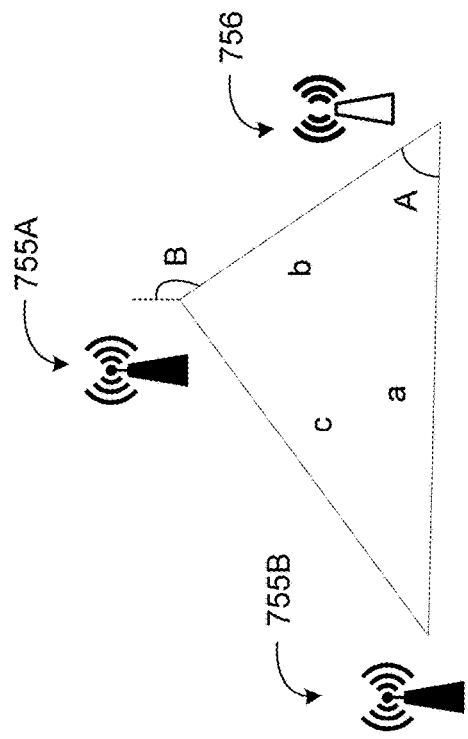
FIG. 7 illustrates an example of trilateration to perform the position determination in accordance with various implementations.
Figure 7:
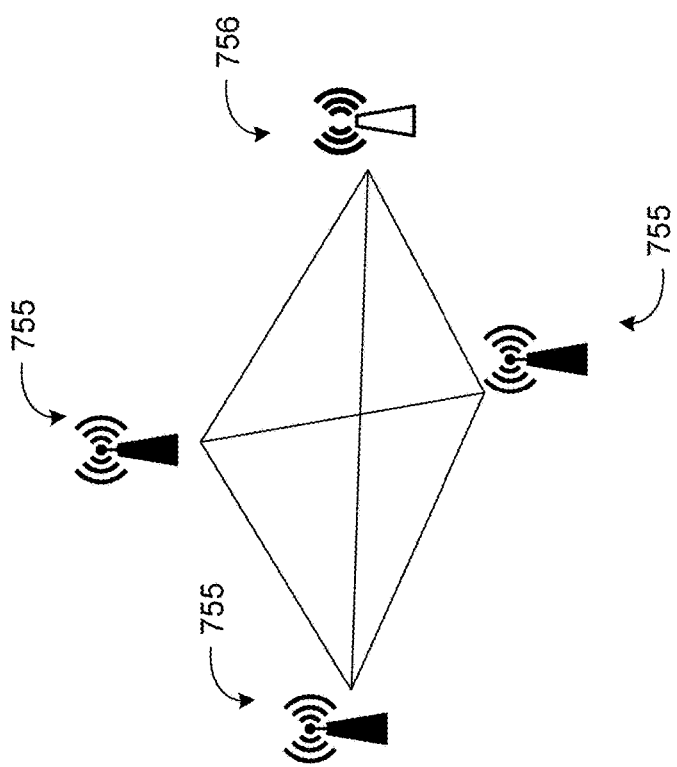

FIG. 7 illustrates an example of trilateration (a form of multilateration) to perform the position determination in accordance with various implementations. In the illustrated example, three access points 755 are the anchor access points (or pseudo-anchor access points) with which the unanchored access point 756 (with unknown coordinates) conducted ranging operations and obtained ranging data.

The position of unanchored access point 756 can be determined using conventional trilateration techniques by converting the coordinates of the neighboring anchor a piece into a two-dimensional reference plane. In some implementations, this is done by simply ignoring the altitude data, or by first confirming that the altitude data across the anchor or pseudo-anchor access points is within a determined range of differences.

This example describes how the position of unanchored access point 756 is calculated based on three access points 755. However, if there are more than three neighbor access points with known coordinates, common multilateration techniques can be used to improve the location estimation of the unanchored access point 756.

To calculate the longitude/latitude of anchor access point 756, implementations may implement Vincenty's formula, which uses input based on starting coordinates, the bearing and the distance. Because the coordinates and the distance are known (e.g., included in the information in Table 1, above), the bearing from one of the access points 755 to access point 756 may be calculated. Therefore, a triangle between two of the anchor or pseudo-anchor access points 755 and the unanchored access point 756 is formed. This example is shown on the right hand side of FIG. 7.

In this example, the distances between the two anchor access points 755A and 755B, between the 'northern' anchor point 755A and unanchored access anchor point 756, and the 'eastern' anchor point 755B and unanchored access point 756, are c, b and a, respectively. The bearing from unanchored access point 756 to the northern anchor access point 755A is shown as the angle B. This can be calculated as:

$$B=90°+A$$

A is calculated using the law of sines as follows:

$$A=\arccos(a^2+b^2-c^2/2ab)$$

To obtain more accurate coordinates for unanchored access point 756, the same calculation described above for 755A, 755B and 756 is also done for other combinations of the ranged to anchor or pseudo anchor access points with the unanchored access point 756. The average result from the various combinations is taken to calculate the coordinates for unanchored access point 756. The unanchored access point 756 now has position coordinates and therefore now becomes newly designated as a pseudo-anchor access point.

Figure 8:
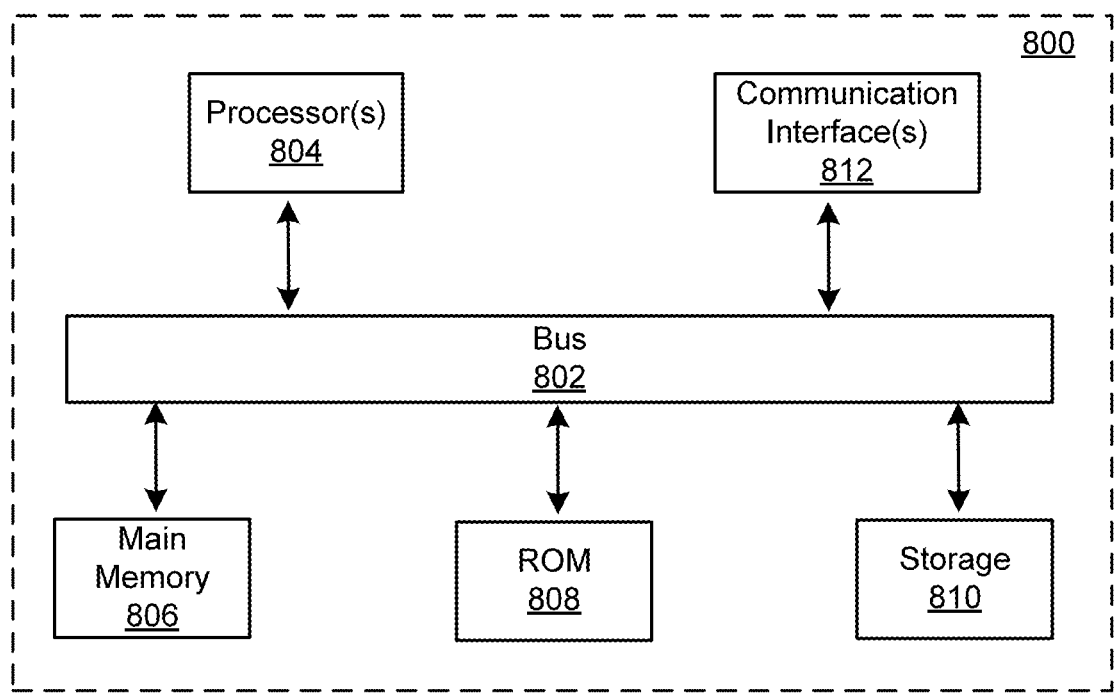
FIG. 8 depicts a block diagram of an example computer system in which the technology described herein may be implemented.

FIG. 8 depicts a block diagram of an example computer system 800 in which the technology described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one implementation, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative implementations, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infrared data communications.

The computer system 800 also includes a communication interface 812 coupled to bus 802. Communication interface 812 provides a two-way data communication coupling to one or more network links that are connected to one or more local networks. For example, communication interface 812 may be an integrated services digital network (ISDN) card, cable modem, satellite modem, or a modem to provide a data communication connection to a corresponding type of telephone line. As another example, communication interface 812 may be a local area network (LAN) card to provide a data communication connection to a compatible LAN (or WAN component to communicated with a WAN). Wireless links may also be implemented. In any such implementation, communication interface 812 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 812, which carry the digital data to and from computer system 800, are example forms of transmission media.

The computer system 800 can send messages and receive data, including program code, through the network(s), network link and communication interface 812. In the Internet example, a server might transmit a requested code for an application program through the Internet, the ISP, the local network and the communication interface 812.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example implementations. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain implementations include, while other implementations do not include, certain features, elements and/or steps.

Terms and phrases used in this document, and variations thereof, unless otherwise expressly stated, should be construed as open ended as opposed to limiting. Adjectives such as "conventional," "traditional," "existing," "normal," "standard," "known," and terms of similar meaning should not be construed as limiting the item described to a given time period or to an item available as of a given time, but instead should be read to encompass conventional, traditional, existing, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A wireless network, comprising:
    a plurality of anchor access points with respective known locations, each anchor access point comprising a processor and a memory including instructions that when executed, cause the processors of the anchor access points to broadcast their respective known locations to other access points in the network;
    a first plurality of unanchored access points neighboring the anchor access points, each unanchored access point of the first plurality of unanchored access points comprising a processor and a memory including instructions that when executed, cause the processors of the first plurality of unanchored access points to receive location information from the anchor access points, and perform range measurements to the anchor access points to determine their respective locations in the wireless network, thereby becoming pseudo-anchor access points, wherein the first plurality of unanchored access points each set a respective Location Configuration Information (LCI) rank to be lower than a lowest LCI rank of neighboring access points from which their physical location was derived upon becoming a newly designated pseudo-anchor access point; and
    a second plurality of unanchored access points in communicative contact with the first plurality of unanchored access points, each unanchored access point of the second plurality of unanchored access points comprising a processor and a memory including instructions that when executed, cause the processors of the second plurality of unanchored access points to receive determined-location information from the pseudo-anchor access points, and perform range measurements to the pseudo-anchor access points to determine their respective locations in the wireless network, thereby becoming pseudo-anchor access points.

2. The wireless network of claim 1, wherein the access points of the second plurality of unanchored access points are not in communication range with the anchor access points.

3. The wireless network of claim 1, further comprising a remaining unanchored access point comprising a processor and a memory including instructions that when executed, cause the processor of the remaining unanchored access point to receive determined-location information from a plurality of neighboring pseudo-anchor access points, perform range measurements to the pseudo-anchor access points to determine its location in the wireless network, wherein the remaining unanchored access point thereby becomes a pseudo-anchor access point.

4. The wireless network of claim 1, wherein an access point of the a second plurality of unanchored access points is further in communicative contact with an anchor access point, and receives the determined-location information from the anchor access point and from a plurality of pseudo-anchor access points, and performs range measurements to said anchor access point and said plurality of pseudo-anchor access points to determine its respective location in the wireless network.

5. The wireless network of claim 1, wherein an access point of the a second plurality of unanchored access points is further in communicative contact with a plurality of anchor access point, and receives the determined-location information from the plurality of anchor access points and from a pseudo-anchor access point, and performs range measurements to said plurality of anchor access point and said pseudo-anchor access point to determine its respective location in the wireless network.

6. The wireless network of claim 1, further comprising anchor and pseudo-anchor access points broadcasting their respective LCI rank to other nodes in the wireless network.

7. The wireless network of claim 1, wherein instructions of the anchor access points and pseudo-anchor access points further cause the anchor access points and pseudo-anchor access points to broadcast their respective location information to other nodes in the wireless network.

8. The wireless network of claim 1, wherein the instructions, when executed, further cause the processor of an unanchored access point of the second plurality of unanchored access points to receive an LCI rank of one of the plurality of pseudo-anchor access points with which it is in communicative contact and to determine whether the received LCI rank is higher than its own LCI rank before ranging to that pseudo-anchor access point.

9. A method for determining physical locations of access points in a wireless network, comprising:
    receiving, at a first access point, location information from a plurality of anchor access points;
    measuring distances between the first access point and the plurality of anchor access points based on the received location information;
    determining a location of the first access point based on the measured distances and the received location information;

setting a Location Configuration Information (LCI) rank of the first access point upon determining its location in the wireless network; and receiving, at a second access point, determined location information from a plurality of access points with known locations, measuring distances between the second access point and the plurality of access points with known locations, and determining a location of the second access point based on the distances measured.

10. The method of claim 9, further comprising:

receiving, at an unanchored access point, determined location information from a plurality of neighboring pseudo-anchor access points;

performing range measurements to the plurality of neighboring pseudo-anchor access points to determine a location of the unanchored access point in the wireless network; and identifying the unanchored access point as a pseudo-anchor access point.

11. The method of claim 10, further comprising repeating the method of claim 10 for each remaining unanchored access point in the wireless network to determine a location for each remaining unanchored access point in the wireless network.

12. The method of claim 9, wherein measuring distances between the second access point and the plurality of access points with known locations comprises measuring distances only between the second access point and pseudo anchor access points.

13. The method of claim 9, wherein measuring distances between the second access point and the plurality of access points with known locations comprises measuring distances between the second access point and a combination of anchor access points and pseudo anchor access points.

14. The method of claim 9, wherein setting the LCI rank comprises setting the LCI rank to be lower than a lowest LCI rank of the plurality of anchor access points from which the first access point derived its physical location.

15. The method of claim 9, further comprising the anchor access points and first access point broadcasting their respective LCI rank to other nodes in the wireless network.

16. The method of claim 9, further comprising anchor and pseudo-anchor access points broadcasting their respective location information to other nodes in the wireless network.

17. The method of claim 9, further comprising an unanchored access point receiving an LCI rank of one of the access points with known locations and determining whether the received LCI rank is higher than its own LCI rank before ranging to that pseudo-anchor access point with a known locations.

* * * * *